United States Patent [19]

Yamada et al.

[11] Patent Number: 4,728,577

[45] Date of Patent: * Mar. 1, 1988

[54] MAGNETIC RECORDING MEDIUM

[75] Inventors: Yasuyuki Yamada; Yoshito Mukaida, both of Kanagawa, Japan

[73] Assignee: Fuji Photo Film Co., Ltd., Kanagawa, Japan

[*] Notice: The portion of the term of this patent subsequent to May 6, 2003 has been disclaimed.

[21] Appl. No.: 650,467

[22] Filed: Sep. 14, 1984

[30] Foreign Application Priority Data

Sep. 16, 1983 [JP] Japan .................. 58-170974

[51] Int. Cl.$^4$ ............... G11B 5/704; G11B 5/706
[52] U.S. Cl. ................... 428/423.7; 427/128; 427/131; 427/132; 428/425.9; 428/480; 428/694; 428/900; 428/532
[58] Field of Search ............. 428/694, 900, 425.9, 428/480, 910, 423.7, 532; 427/131, 132, 128

[56] References Cited

U.S. PATENT DOCUMENTS

| 3,501,344 | 3/1970 | Watson | 428/694 |
| 4,112,187 | 9/1978 | Asakura | 428/694 |
| 4,275,107 | 6/1981 | Burtkus | 428/220 |
| 4,316,927 | 2/1982 | Kimura | 428/694 |
| 4,411,956 | 10/1983 | Matsufuji | 428/900 |
| 4,431,700 | 2/1984 | Yamada | 428/694 |
| 4,439,486 | 3/1984 | Yamada | 428/694 |
| 4,497,865 | 2/1985 | Minami | 428/694 |
| 4,499,121 | 2/1985 | Yamaguchi | 427/128 |
| 4,587,170 | 5/1986 | Hanai | 428/425.9 |

Primary Examiner—Ellis P. Robinson
Attorney, Agent, or Firm—Sughrue, Mion, Zinn, Macpeak & Seas

[57] ABSTRACT

A magnetic recording medium is disclosed which comprises a non-magnetic support having coated thereon a magnetic layer comprising a magnetic substance and a binder comprising a cellulose derivative, a polyurethane resin and a polyisocyanate, the non-magnetic support having a heat shrinkage of about 0.15% or less and the water content of the medium being at least about 0.35% by weight.

35 Claims, No Drawings

1

MAGNETIC RECORDING MEDIUM

FIELD OF THE INVENTION

The present invention relates to a magnetic recording medium and more particularly, it relates to a magnetic recording medium having improved skew and durability and better surface properties.

BACKGROUND OF THE INVENTION

Magnetic recording media having a magnetic recording layer containing a cellulose derivative, a polyurethane and a polyisocyanate are described in, for example, U.S. Pat. Nos. 3,242,005 and 3,630,771. The conventional magnetic recording media suffer the occurrence of skew distortion.

"Skew distortion" refers to a video tape defect in which images are deformed and distorted because the magnetic tape expands or contracts in the runnning direction, and consequently the length of the track to be recorded is changed. In order to prevent skew and to improve the durability of such a tape, after a magnetic layer is coated on a support, the resulting coated layer is generally subjected to heat treatment at a relatively high temperature. However, such heat treatment deteriorates the surface smoothness of the support due to heat shrinkage and thereby deteriorates the surface properties of the magnetic recording medium itself.

In view of this problem, it has been proposed in Japanese Patent Application (OPI) No. 15927/82 (as used herein, "OPI" refers to a published, unexamined Japanese Patent Application") to reduce the heat shrinkage of the support to thereby reduce skew. However, if a coated layer is subjected to heat treatment at a high temperature for a short period of time to accelerate the hardening reaction, this method has the disadvantage that chroma S/N is reduced. Further, when the heat treatment is carried out at a relatively low temperature, still life is often reduced.

SUMMARY OF THE INVENTION

A primary object of the present invention is to provide a magnetic recording medium having reduced skew.

A second object of the present invention is to provide a magnetic recording medium having improved chroma S/N.

A third object of the present invention is to provide a magnetic recording medium having improve still life.

After thorough investigations, it has been found that these and other objects of the present invention can be attained by a magnetic recording medium comprising a support having coated thereon a magnetic layer comprising a cellulose derivative, a polyurethane resin and a polyisocyanate, the support having a heat shrinkage of about 0.15% or less, and the water content of the whole magnetic recording medium being about 0.35% or more.

DETAILED DESCRIPTION OF THE INVENTION

In the present application, "heat shrinkage" refers to the shrinkage obtained after allowing the support to heat shrink at 70° C. for 48 hours in a tension free state.

As used herein, "water content" refers to water content in the whole tape during the preparation of a magnetic tape at the time when a polyisocyanate is reacted with water.

Cellulose derivatives used in the present invention include nitrocellulose, cellulose acetate butyrate, cellulose propionate and ethyl cellulose having an average molecular weight of about 10,000 to 300,000, and preferably 15,000 to 70,000. Preferably, they have a free OH group content of about 7.5 to 40%. Nitrocellulose preferably has a degree of nitration of about 10 to 15%. They contribute to providing heat resistance, toughness and blocking resistance.

Polyurethane resins which can be used in the present invention have an average molecular weight of 20,000 to 100,000, preferably 30,000 to 80,000, and include polyester polyurethane resins and polyether polyurethane resins. These polyurethane resins can be obtained by a reaching (1) polyester polyols (which are obtained by a reaction of organic dibasic acids having 4 to 40 carbon atoms, preferably 8 to 30 carbon atoms, such as phthalic acid, adipic acid, dimerized linolic acid or maleic acid with glycols having 4 to 10 carbon atoms, preferably 6 to 8 carbon atoms, such as ethylene glycol, propylene glycol, butylene glycol or diethylene glycol and with polyhydric alcohols having 4 to 10 carbon atoms, preferbly 6 to 8 carbon atoms, such as trimethylolpropane, hexanetriol, glyceroll, trimethylol ethane or pentaerythritol) or polyether polyols (which are obtained by the reaction of propylene oxide or ethylene oxide with the above described glycol and polyhydric alcohol) and (2) diisocyanate compounds such as tolylene diisocyanate, 4,4'-diphenylmethane diisocyanate, hexamethylene diisocyanate or meta-xylylene diisocyanate as described in *Polyurethanes Chemistry & Technology* Part 1: Chemistry (John Wiley & Sons, 1962).

Further, polyurethane which is disclosed in Japanese Patent Application (OPI) No. 122234/80 can be also used.

Polyisocyanates which can be used in the present invention include isocyanates and adducts thereof having at least two isocyanate groups such as aliphatic diisocyanates, aliphatic diisocyanates having cyclic groups, aromatic diisocyanates, triisocyanates and tetraisocyanates thereof and adducts thereof as described in, for example, U.S. Pat. No. 4,439,486.

Examples of polyisocyanates are isocyanates such as ethane diisocyanate, butane diisocyanate, hexane diisocyanate, 2,2'-dimethylpentane diisocyanate, 2,2',4-trimethylpentane diisocyanate, decane diisocyanate, ω,ω'-diisocyanate-1,3-dimethylbenzol, ω,ω'-diisocyanate-1,2-dimethylcyclohexane diisocyanate, ω,ω'-diisocyanate-1,4-diethylbenzol, ω,ω'-diisocyanate-1,5-dimethyl naphthalene, ω,ω'-diisocyanate-n-propyl-biphenyl, 1,3-phenylene diisocyanate, 1-methylbenzol-2,4-diisocyanate, 1,3-dimethylbenzol-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-disocyanate, 3,3'-dimethoxydimethylphenylmethane-4,4'-diisocyanate, 4,4'-diethoxydiphenylmethane-4,4'-diisocyanate, 1-methylbenzol-2,4,6-triisocyanate, 1,3,5-triethylbenzol-2,4,6-trioscyanate, diphenylmethane-2,4,4'-triisocyanate, triphenylmethane-4,4',4"-triisocyanate, tolylene diisocyanate, and 1,5-naphtylene diisocyanate; adduct products of dimers or trimers of these isocyanates; or adducts of these isocyanates and dihydric or trihydric polyalcohols. These adducts include an adduct of tolylene diisocyanate with trimethylolpropane, an adduct of 3 moles of tolylene diisocyanate with trimethylolpropane, an adduct of 3 moles of hexamethylene diisocyanate with trimethylolpropane, an adduct of 2 moles of hexamethylene diisocyanate with trimethylolpropane and adducts optionally selected from the above-described isocyanates. Of these, an adduct of 3 mols of tolylene diisocyanate with 1 mol of trimethylolpropane and an adduct of 3 mols of hexamethylene diisocyanate with 1 mol of trimethylolpropane are preferred.

The cellulose derivative, polyurethane resin and polyisocyanate can be used in amounts of about 5 to 50% by weight, about 30 to 70% by weight and 5 to 55% by weight, respectively, based on the total weight of the binder composition.

The binder composition is used in an amount of from about 18 to 35% by weight per 100% by weight of magnetic substance.

A heat treatment step which is generally conducted at about 55° to 80° C. for about 20 to 50 hours after the magnetic layer is provided can be omitted, and skew reduced by adjusting the heat shrinkage of the uncoated support to 0.15% or less, preferably 0.12% or less. In order to adjust the heat shrinkage to 0.15% or less, for example, heat treatment is conducted on a biaxially stretched polyester support. The heat treatment of a support having a thickness of 15μ in a roll form is carried out at a winding stress of from about 0 to 2 Kg/mm² at about 40° to 100° C. for about 15 to 80 hours. When heat treatment is continuously conducted, the conditions are a winding stress of about 0 to 1.6 Kg/mm², a temperature of about 110° to 130° C. and a period of about 3 to 10 seconds. It is preferred that the heat treatment is conducted after the inner residual stress of the support is removed at the preparation of the support, for example, by heating the support under an outer tension of 0 to 250 g/mm² at a temperature of 140° to 210° C. for 0.5 to 20 seconds as described in U.S. Pat. No. 2,779,684.

An effective method for accelerating the hardening reaction of polyisocyanates is by providing water in the magnetic layer. That is, a polyisocyanate is reacted with water to form urea bonds and biuret bonds in a certain proportion. The ratio of (urethane bonds + allophanate bonds) and (urea bonds + biuret bonds) can be brought within a range of 85:15 to 60:40 by adjusting the water content in the magnetic recording medium to about 0.35 wt % or more, preferably about 0.40 wt % or more, and more preferably 0.42 wt % or more resulting in a binder structure that increases the durability of the magnetic layer. It is effective to subject such a magnetic layer coated on a support in a roll form to heat treatment at about 30° C. to 50° C. for about 10 to 50 hours to accelerate the above reaction without affecting the other characteristics. When the water content is less than about 0.35wt %, the proportion of (urea bonds and biuret bonds) cannot be brought within the above range in a short period of time and satisfactory durability cannot be obtained without heat treatment. In this case, when heat treatment is performed at a high temperature of about 60° C. to 80° C. to complete the reaction within a short period of time, the surface properties of the magnetic layer are adversely affected along with the chroma S/N.

Ajustment of the water content of the magnetic recording medium to 0.35 wt % or more can be effectively achieved by exposing a magnetic tape to a high temperature and high humidity, by soaking the magnetic tape in water, by introducing the magnetic tape into an atmosphere having a lower temperature to produce water condensation.

Adjustment of the water content can be carried out after coating the magnetic composition on a support and drying it, or immediately before or after calendering treatment.

The upper limit of the water content of the magnetic recording medium is not particularly limited, but is generally less than 1 wt %, and preferably less than 0.7 wt %, of the total magnetic recording medium.

If the water content is more than 1 wt %, friction coefficient of the magnetic recording medium increases and the tape beomes viscous, possibly requiring a second drying.

Magnetic particles, additives such as lubricants, organic solvents, abrasives or anti-static agents, supports and methods for preparing a magnetic recording medium according to the present invention are disclosed in U.S. Pat. No. 4,135,016.

The present invention is further illustrated in more detail by the following Examples. Materials, quantities and operations orders can be changed by those skilled in this art so long as the gist of the present invention is not essentially changed, and the present invention is notto be construed as being limited to the following Examples. All parts, ratios and percents are by weight, unless otherwise indicated.

EXAMPLE (1) Magnetic coating compositions (I) to (V) were prepared as follows:

| Magnetic Coating Composition (I): | |
|---|---|
| Co-coated γ-Fe₂O₃ (Hc 630 Oe, average particle size: 0.3 μm, acicular ratio: 1:5 to 1:6) | 300 parts |
| Nitrocellulose (average molecular weight: 70,000, degree of nitration: 11.8) | 35 parts |
| Polyurethane Resin (synthesized from Butylene Adipate and Tolylene Diisocyanate (1.5:1 by mol), molecular weight: 47,000) | 26 parts |
| Carbon Black (electroconductive Carbon Black; average particle diameter: 30 mμ) | 18 parts |
| Al₂O₃ (average particle diameter: 0.2μ) | 5 parts |
| Myristic Acid | 7 parts |
| Butyl Stearate | 1 part |
| Methyl Ethyl Ketone/Butyl Acetate (3/7) | 750 parts |

A composition having the formulation indicated above was mixed, kneaded and dispersed in a ball mill for 48 hours and then in a sand mill for 20 minutes, after which 25 parts (solid content) of a reaction product of 1 mole of trimethylolpropane and 3 moles of toluene diisocynate (trade name "Coronate L" manufactured by Nippon Polyurethane Co., Ltd.) were added thereto as a low molecular weight polyisocyanate component to prepare a magnetic coating composition.

Magnetic Coating Composition (II):

Magnetic coating composition (II) was prepared in the same manner as coating composition (I) except that 35 parts of cellulose acetate butyrate (average molecular weight: 50,000) was used instead of the nitrocellulose.

Magnetic Coating Composition (III):

Magnetic coating composition (III) was prepared in the same manner as coating composition (I) except that 61 parts of vinyl chloride-vinyl acetate resin (vinyl chloride:vinyl acetate:vinyl alcohol=91:3:6 (weight ratio), average polymerization degree: 400) was used and the nitrocellulose and the polyurethane resin were omitted.

Magnetic Coating Composition (IV):

Magnetic coating composition (IV) was prepared in the same manner as coating composition (I) except that 35 parts of the same polyurethane resin as used in Coating Composition (I) was used instead of the nitrocellulose.

Magnetic Coating Composition (V):

Magnetic coating composition (V) was prepared in the same manner as coating composition (I) except that 26 parts of the same nitrocellulose as used in Coating Composition (I) was replaced for the polyurethane resin.

(2) A biaxially stretched polyethylene terephthalate support having a thickness of $15\mu$ was used to prepare four supports (a) to (d) as indicated in Table 1 having different heat shrinkages produced by the different of heat treatments conducted.

TABLE 1

| Support | Heat Shrinkage (%) | Conditions of Heat Treatment | | |
|---|---|---|---|---|
| | | Winding Stress (kg/mm$^2$) | Temperature (°C.) | Time (hr.) |
| (a) | 0.05 | 0.2 | 70 | 24 |
| (b) | 0.10 | 0.67 | 70 | 24 |
| (c) | 0.20 | No heat treatment | | |
| (d) | 0.25 | No heat treatment | | |

(3) Preparation water treatment and hardening of the magnetic tapes were carried out as follows.

winding the layer, it was exposed to an atmosphere at 40° C. and 80% relative humidity for 1.5 seconds to increase its water content and was slit to ½ inch to prepare a video tape.

The results as shown in Table 2 were determined in the following manner.

(1) Residual-NCO Amount (%)

The residual-NCO amount was measured by an FT-IR (Fourier transformation infrared absorption spectrometer) to determine the extent to which hardening reaction proceeded. The -NCO amount which was measured immediately after coating films which had been allowed to stand at 40° C. for 24 hours in a roll form was assumed to be 100% and residual -NCO amount of other tapes was compared with this standard tape.

(2) Chroma S/N (dB)

Chroma S/N was determined using a VTR (model "NV-8200" manufactured by Matsushita Electric Industries Co., Ltd.) and a color video noise meter ("925C type" manufactured by Shibasoku Co., Ltd.). The values shown in Table 2 were relative values, assigning the value of ±0 dB to Sample No. 2.

(3) Skew ($\mu$ sec)

The degree of distortion of an image of straight lines appearing at the upper edge of a TV monitor screen was determined expressed in units of time, using an "NV-8300" VTR manufactured by Matsushita Electric Industries Co., Ltd. and using a tape which had made 300 passes at 40° C. and 80% relative humidity in the 2 hour-mode. The skew value is excellent when the value is $17\mu$ sec. or less.

(4) Still Life

The time for the reproduced RF output level to decrease to ½ of the original level was measured in a still mode using a video tape after 100 successive runs on the above described VTR.

TABLE 2

| No. | Heat Shrinkage of Support (%) | Magnetic Coating Composition | Water Treatment | Water Content (%) | Residual —NCO (%) | Chroma S/N (dB) | Skew (μsec) | Still Life (min.) |
|---|---|---|---|---|---|---|---|---|
| 1 | 0.05 | I | performed | 0.50 | 9 | ±0 | 7 | 30 or more |
| 2 | 0.10 | I | none | 0.24 | 23 | ±0.1 | 12 | 9* |
| 3 | 0.10 | I | performed | 0.52 | 11 | ±0 | 9 | 30 or more |
| 4 | 0.10 | II | performed | 0.46 | 10 | +0.1 | 8 | " |
| 5 | 0.10 | III | performed | 0.45 | 12 | +0.5* | 9 | 4* |
| 6 | 0.10 | IV | performed | 0.48 | 11 | −0.6* | 9 | 8* |
| 7 | 0.10 | V | performed | 0.43 | 13 | −0.4* | 10 | 5* |
| 8 | 0.20 | I | none | 0.29 | 25 | +0.1 | 23* | 7* |
| 9 | 0.25 | I | performed | 0.43 | 11 | ±0 | 27* | 30 or more |

*particularly deteriorated properties

A subbing layer composed of a polyester having a composition of

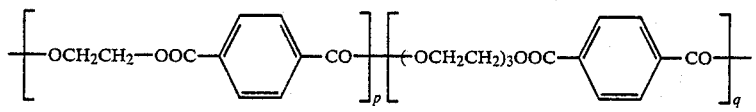

wherein p is an integer of 30 to 100 and q is an integer of 20 to 150, a softening point of 125° C., a glass transition point of 25° C., tensile strength of 2.42 kg/mm$^2$ and an elongation ratio of 1,100% was coated on supports (a)–(d) described in (2) above and the magnetic coating compositions (I)–(V) described in (1) were coated thereon and then dried in a dry thickness of $5\mu$. After drying, the coated layer was subjected to super-calendering treatment at 100m/min. and immediately before From the Example, it is apparent that Sample Nos. 1 to 7 using supports having low heat shrinkage exhibit excellent values and that Sample Nos. 1, 3, 4 and 9, in which two binders were used and the magnetic layers were subjected to water treatment, have excellent still life.

It is clear from the above results that a magnetic recording medium having excellent chroma S/N, skew and still life can be obtained by adding a polyisocyante, using two kinds of binders in combination and a support having low heat shrinkage and by controlling the water content of magnetic layers to a value above about 0.40%.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support having coated thereon a magnetic layer comprising a magnetic substance and a binder comprising a cellulose derivative, a polyurethane resin and a polyisocyanate, said non-magnetic support having a heat shrinkage of about 0.15% or less and the water content of the medium being at least about 0.35% by weight.

2. The magnetic recording medium claimed in claim 1, wherein said cellulose derivative is selected from the group consisting of nitrocellulose, cellulose acetate butyrate, cellulose propionate and ethyl cellulose.

3. The magnetic recording medium claimed in claim 1, wherein said cellulose derivative has an average molecular weight of from about 10,000 to 300,000.

4. The magnetic recording medium claimed in claim 3, wherein said cellulose derivative has an average molecular weight of from about 15,000 to 70,000.

5. The magnetic recording medium claimed in claim 1, wherein said cellulose derivative has a free OH group content of about 7.5 to 40%.

6. The magnetic recording medium claimed in claim 1, wherein said cellulose derivative is nitrocellulose having a degree of nitration of about 10 to 15%.

7. The magnetic recording medium claimed in claim 1, wherein said polyurethane resin is selected from the group consisting of polyester polyurethane resins and polyether polyurethane resins.

8. The magnetic recording medium claimed in claim 7, wherein said polyester polyurethane resin is a reaction product of a polyester polyol and a diisocyanate compound, said polyester polyol being a reaction product of an organic dibasic acid having 4 to 40 carbon atoms, a glycol having 4 to 10 carbon atoms and a polyhydric alcohol having 4 to 10 carbon atoms.

9. The magnetic recording medium claimed in claim 8, wherein said organic dibasic acid has 8 to 30 carbon atoms.

10. The magnetic recording medium claimed in claim 8, wherein said glycol has 6 to 8 carbon atoms.

11. The magnetic recording medium claimed in claim 8, wherein said polyhydric alcohol has 6 to 8 carbon atoms.

12. The magnetic recording medium claimed in claim 8, wherein said organic dibasic acid is selected from the group consisting of phthalic acid, adipic acid, dimerized linolic acid and maleic acid.

13. The magnetic recording medium claimed in claim 8, wherein said glycol is selected from the group consisting of ethylene glycol, propylene glycol, butylene glycol and diethylene glycol.

14. The magnetic recording medium claimed in claim 8, wherein said polyhydric alcohol is selected from the group consisting of trimethylolpropane, hexanetriol, glycerol, trimethylolethane and pentaerythritol.

15. The magnetic recording medium claimed in claim 7, wherein said polyether polyurethane resin is a reaction product of a polyether polyol and a diisocyanate, said polyether polyol being a reaction product of a glycol having 4 to 40 carbon atoms, a polyhydric alcohol having 4 to 40 carbon atoms and propylene oxide or ethylene oxide.

16. The magnetic recording medium claimed in claim 15, wherein said glycol has 6 to 8 carbon atoms.

17. The magnetic recording medium claimed in claim 15, wherein said polyhydric alcohol has 6 to 8 carbon atoms.

18. The magnetic recording medium claimed in claim 15, wherein said glycol is selected from the group consisting of ethylene glycol, propylene glycol, butylene glycol and diethylene glycol.

19. The magnetic recording medium claimed in claim 16, wherein said polyhydric alcohol is selected from the group consisting of trimethylolpropane, hexanetriol, glycerol, trimethylolethane and pentaerythritol.

20. The magnetic recording medium claimed in claims 8 or 15, wherein said diisocyanate compound is selected from the group consisting of tolylene diisocyanate, 4,4'-diphenylmethane diisocyanate, hexamethylene diisocyanate and meta-xylylene diisocyanate.

21. The magnetic recording medium claimed in claim 1, wherein said polyisocyanate is an isocyanate or an adduct thereof selected from the group consisting of an aliphatic diisocyante, an aliphatic diisocyanate having a cyclic group, an aromatic diisocyanate, a triisocyanate, and a tetraisocyanate.

22. The magnetic recording medium claimed in claim 1, wherein said polyisocyanate is selected from the group consisting of ethane diisocyanate, butane diisocyanate, hexane diisocyanate, 2,2'-dimethylpentane diisocyanate, 2,2',4-trimethylpentane diisocyanate, decane diisocyanate, $\omega,\omega'$-diisocyanate-1,3-dimethylbenzol, $\omega,\omega'$-diisocyanate-1,2-dimethylcyclohexane diisocyanate, $\omega,\omega'$-diisocyanate-1,4-diethylbenzol, $\omega,\omega'$-diisocyanate-1,5-dimethyl naphthalene, $\omega,\omega'$-diisocyanate-n-propylbiphenyl, 1,3-phenylene diisocyanate, 1-methylbenzol-2,4-diisocyanate, 1,3-dimethylbenzol-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydimethylphenylmethane-4,4'-diisocyanate, 4,4'-diethoxydiphenylmethane-4,4'-diisocyanate, 1-methylbenzol-2,4,6-triisocyanate, 1,3,5-triethylbenzol-2,4,6-trioscyanate, diphenylmethane-2,4,4'-triisocyanate, triphenylmethane-4,4',4"-triisocyanate, tolylene diisocyanate, and 1,5-naphtylene diisocyanate; adduct products of dimers or trimers of these isocyanates; or adducts of these isocyanates and dihydric or trihydric polyalcohols.

23. The magnetic recording medium claimed in claim 22, wherein said adduct is selected from the group consisting of an adduct of 3 mols of tolylene diisocyanate with 1 mol of trimethylolpropane and an adduct of 3 mols of hexamethylene diisocyanate.

24. The magnetic recording medium claimed in claim 1, wherein said cellulose derivative is present in an amount of about 5 to 50% by weight, said polyurethane resin is present in an amount of about 30 to 70% by weight and said polyisocyanate is present in an amount of about 5 to 55% by weight, based on the total amount of the binder composition.

25. The magnetic recording medium claimed in claim 1, wherein said binder is present in an amount of from about 18 to 35% by weight per 100% by weight of said magnetic substance.

26. The magnetic recording medium claimed in claim 1, wherein said non-magnetic support has a heat-shrinkage of about 0.12% or less.

27. The magnetic recording medium claimed in claim 1, wherein said water content is at least about 0.40 wt %.

28. The magnetic recording medium claimed in claim 27, wherein said water content is at least about 0.42 wt %.

29. The magnetic recording medium claimed in claim 1, wherein said cellulose derivative is selected from the group consisting of nitrocellulose, cellulose acetate butyrate, cellulose propionate and ethyl cellulose and has an average molecular weight of from about 10,000 to 300,000, wherein said polyurethane resin is selected from the group consisting of polyester polyurethane resins and polyether polyurethane resins, said polyisocyanate is an isocyanate or an adduct thereof selected from the group consisting of an aliphatic diisocyanate, an aliphatic diisocyanate having a cyclic group, an aromatic diisocyanate, a triisocyanate and a tetraisocyanate and wherein said cellulose derivative is present in an amount of about 5 to 50% by weight, said polyurethane resin is present in an amount of about 30 to 70% by weight and said polyisocyanate is present in an amount of about 5 to 55% by weight, based on the total amount of the binder composition.

30. The magnetic recording medium claimed in claim 1, wherein the water content of the magnetic recording medium is less than 1 wt %.

31. The magnetic recording medium claimed in claim 29, wherein the water content of the magnetic recording medium is less than 0.7 wt %.

32. The magnetic recording medium claimed in claim 1, wherein said support is a biaxially stretched polyester support and said heat shrinkage of about 0.15% or less is obtained by heat treating said support having a thickness of $15\mu$ in roll form at a winding stress of from about 0 to 2 $Kg/m^2$ at about 40 to 100° C. for about 15 to 80 hours.

33. The magnetic recording medium claimed in claim 29, wherein said support is a biaxially stretched polyester support and said heat shrinkage of about 0.15% or less is obtained by heat treating said support having a thickness of $15\mu$ in roll form at a winding stress of from about 0 to 2 $Kg/m^2$ at about 40 to 100° C. for about 15 to 80 hours.

34. The magnetic recording medium claimed in claim 1, wherein said support is a biaxially stretched polyester support, and said heat shrinkage of about 0.15% or less is obtained by continuously conducting heat treating at a winding stress of about 0 to 1.6 $Kg/mm^2$ at a temperature of about 110° to 130° C. for a period of about 3 to 10 seconds.

35. The magnetic recording medium claimed in claim 29, wherein said support is a biaxially stretched polyester support, and said heat shrinkage of about 0.15% or less is obtained by continuously conducting heat treating at a winding stress of about 0 to 1.6 $Kg/mm^2$ at a temperature of about 110° to 130° C. for a period of about 3 to 10 seconds.

* * * * *